United States Patent
Zhang et al.

(10) Patent No.: US 11,652,564 B2
(45) Date of Patent: *May 16, 2023

(54) DATA COMMUNICATIONS SYSTEM, OPTICAL LINE TERMINAL, AND BASEBAND UNIT

(71) Applicant: Huawei Technologies Co., Ltd., Shenzhen (CN)

(72) Inventors: Lun Zhang, Dongguan (CN); Xifeng Wan, Dongguan (CN); Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/318,334

(22) Filed: May 12, 2021

(65) Prior Publication Data

US 2021/0266090 A1    Aug. 26, 2021

Related U.S. Application Data

(63) Continuation of application No. 15/862,285, filed on Jan. 4, 2018, now Pat. No. 11,038,617, which is a
(Continued)

(51) Int. Cl.
*H04J 14/02* (2006.01)
*H04Q 11/00* (2006.01)

(52) U.S. Cl.
CPC ...... *H04J 14/0239* (2013.01); *H04J 14/0223* (2013.01); *H04J 14/0249* (2013.01);
(Continued)

(58) Field of Classification Search
CPC ............ H04J 14/0239; H04J 14/0223; H04J 14/0249; H04J 14/0245; H04Q 11/0067; H04Q 2011/0064
See application file for complete search history.

(56) References Cited

U.S. PATENT DOCUMENTS 11,038,617 B2 *  6/2021  Zhang ............... H04J 14/0249
2007/0041384 A1  2/2007  Das et al.
(Continued)

FOREIGN PATENT DOCUMENTS

CN    102082976 A    6/2011
CN    102209280 A   10/2011
(Continued)

OTHER PUBLICATIONS

"Series G: Transmission Systems and Media, Digital Systems and Networks Digital sections and digital line system—Optical line systems for local and access networks 10-Gigabit-capable passive optical networks (XG-PON): Transmission convergence (TC) layer specification," ITU-T G.987.3, Jan. 2014, 146 pages.
(Continued)

*Primary Examiner* — Christine Ng
(74) *Attorney, Agent, or Firm* — Conley Rose, P.C.

(57) ABSTRACT

This application discloses a bandwidth allocation method, an optical line terminal (OLT), an optical network unit (ONU), and a system, where the method includes receiving a bandwidth request from each ONU, where the ONU includes an ONU1, generating a bandwidth map (BWMap) message according to bandwidth requested by the ONU and bandwidth configured for the ONU, where the BWMap message includes a first allocation identifier (Alloc-ID1), a first time corresponding to the Alloc-ID1, a second allocation identifier (Alloc-ID2), and a second time corresponding to the Alloc-ID2, and both the Alloc-ID1 and the Alloc-ID2 are allocated to the ONU1 for use, and sending the BWMap message to each ONU. Therefore, a problem that a transmission delay does not satisfy a requirement when a passive optical network (PON) system is applied to mobile backhaul is resolved, a data transmission rate and data transmission efficiency are improved, and user satisfaction is improved.

26 Claims, 10 Drawing Sheets

Related U.S. Application Data continuation of application No. PCT/CN2016/113857, filed on Dec. 30, 2016.

(52) U.S. Cl.
CPC ...... *H04Q 11/0067* (2013.01); *H04J 14/0245* (2013.01); *H04Q 2011/0064* (2013.01); *H04Q 2011/0088* (2013.01)

(56) References Cited

U.S. PATENT DOCUMENTS

| | | | |
|---|---|---|---|
| 2007/0133596 A1* | 6/2007 | Kim | H04L 47/30 370/465 |
| 2008/0095102 A1* | 4/2008 | Meng | H04W 74/08 370/329 |
| 2008/0279554 A1* | 11/2008 | Kazawa | H04Q 11/0067 398/69 |
| 2009/0103545 A1* | 4/2009 | Anschutz | H04L 47/6215 370/395.4 |
| 2010/0183304 A1 | 7/2010 | Spector | |
| 2010/0202354 A1* | 8/2010 | Ho | G06Q 50/32 370/328 |
| 2010/0208747 A1 | 8/2010 | Gordon et al. | |
| 2010/0215369 A1* | 8/2010 | Effenberger | H04Q 11/0067 398/67 |
| 2012/0155279 A1* | 6/2012 | Ho | H04W 72/0406 370/241 |
| 2013/0045011 A1 | 2/2013 | Zhang et al. | |
| 2014/0093243 A1 | 4/2014 | Dui et al. | |
| 2014/0186039 A1* | 7/2014 | Luo | H04Q 11/0067 398/66 |
| 2015/0050024 A1* | 2/2015 | Luo | H04J 14/0267 398/68 |

FOREIGN PATENT DOCUMENTS

| | | |
|---|---|---|
| CN | 102271133 A | 12/2011 |
| CN | 102387426 A | 3/2012 |
| JP | 2012518319 A | 8/2012 |
| RU | 2575859 C1 | 2/2016 |
| WO | 2010095104 A3 | 10/2010 |
| WO | 2011097904 A1 | 8/2011 |
| WO | 2012082375 A1 | 6/2012 |

OTHER PUBLICATIONS

Editor G.XGS-PON, "Draft new Recommendation ITU-T G.XGS-PON (for Consent, Feb. 26, 2016)," Part 1, TD 523 Rev.1 (PLEN/15), Feb. 15-26, 2016, 150 pages.

Editor G.XGS-PON, "Draft new Recommendation ITU-T G.XGS-PON (for Consent, Feb. 26, 2016)," Part 2, TD 523 Rev.1 (PLEN/15), Feb. 15-26, 2016, 150 pages.

Arokkiam, J., et al. "Optimised QoS-aware DBA mechanisms in XG-PON for upstream traffic in LTE Backhaul," XP032979015, 4th International Conference on Future Internet of Things and Cloud Workshops, 2016, pp. 361-368.

Dawes, P., et al., "Draft G.989.3 TC layer for NG-PON2," ITU-T Draft, Mar. 6, 2014, 150 pages.

* cited by examiner

DATA COMMUNICATIONS SYSTEM, OPTICAL LINE TERMINAL, AND BASEBAND UNIT

CROSS-REFERENCE TO RELATED APPLICATION

This application is a continuation of U.S. patent application Ser. No. 15/862,285, filed on Jan. 4, 2018, which is a continuation of International Application No. PCT/CN2016/113857, filed on Dec. 30, 2016. All of the afore-mentioned patent applications are hereby incorporated by reference in their entireties.

TECHNICAL FIELD

This application relates to the optical communications field, and in particular, to a data communications system, an optical line terminal (OLT), and a baseband unit (BBU).

BACKGROUND

A passive optical network (PON) is a point-to-multipoint network topology structure, and generally includes an OLT that is located at a central office (CO), multiple optical network units (ONUs) that are located at a user end, and an optical distribution network (ODN) that is located between the OLT and the multiple ONUs.

In a PON system, dynamic bandwidth assignment (DBA) is a mechanism in which upstream bandwidth can be dynamically allocated within a time interval at a microsecond ($\mu s$) or millisecond (ms) level. In an existing PON system, an OLT delivers, by means of broadcasting, a bandwidth map (BWMap) message according to requested bandwidth reported by each ONU such that the ONU transmits, using the BWMap message, data within a time allocated by the OLT. However, because in the current bandwidth allocation mechanism, an average delay generated from sending data using an upstream port of the ONU to receiving the data using a PON port of the OLT is at least 300 $\mu s$, and even 1 to 4 ms, for a mobile backhaul scenario to which fifth generation (5G) is applied, due to a real time transmission requirement of user data, a system stipulates that the delay generated in a period from sending the data using the upstream port of the ONU to receiving the data using the port of the OLT is within 20 $\mu s$. In a current DBA mechanism, a delay in a mobile bearing scenario cannot satisfy a delay performance requirement of service transmission.

SUMMARY

To resolve a problem that a transmission delay does not satisfy a requirement when a PON system is applied to mobile backhaul, and to improve a data transmission rate and transmission efficiency by reducing the transmission delay of the PON system, embodiments of the present disclosure provide the following technical solutions.

In a first design solution, a bandwidth allocation method is provided, and the method includes receiving a bandwidth request sent by each ONUs, where the ONU includes a first ONU (ONU1), generating a BWMap message according to bandwidth requested by the ONU and bandwidth configured for the ONU, where the BWMap message includes a first allocation identifier (Alloc-ID1), a first time corresponding to the Alloc-ID1, a second allocation identifier (Alloc-ID2), and a second time corresponding to the Alloc-ID2, and both the Alloc-ID1 and the Alloc-ID2 are allocated to the ONU1 for use, and sending the BWMap message to each ONU.

In this design solution, after such design, bandwidth authorization may be allocated to video data of the ONU1 twice in one period in order to transmit the video data. One transmission period is generally 125 $\mu s$. That is, within the 125 $\mu s$, the video data may be transmitted twice. If one period is 125 $\mu s$, a transmission time corresponding to each transmission container (T-CONT) is 125/6 that is approximately 21 $\mu s$, that is, a time interval between transmitting the video data for a first time and transmitting the video data for a next time is 63 $\mu s$. However, in an existing DBA transmission mechanism, if the ONU1 transmits the video data only once within 125 $\mu s$, a time interval between transmitting the video data for a current time and transmitting the video data for a next time is 125 $\mu s$, and if the ONU1 misses this time of data transmission, the ONU1 needs to wait for 125 $\mu s$ to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 $\mu s$ such that a problem that a transmission delay does not satisfy a requirement when a PON system is applied to mobile backhaul is resolved, a data transmission rate and data transmission efficiency are improved, and user satisfaction is improved.

Based on the foregoing design solution, in a possible design, the BWMap message further includes a third allocation identifier (Alloc-ID3) and a third time corresponding to the Alloc-ID3, the Alloc-ID3 is used to identify a second ONU (ONU2), and the third time is used to be allocated to the ONU2 for use.

Based on the foregoing design solution, in another possible design, the first time includes a start time 1 and an end time 1, the second time includes a start time 2 and an end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the end time 2 is used to indicate a byte at which the ONU1 ends transmission of the second data stream, and the first data stream and the second data stream carry service flows of a same type, or the first data stream and the second data stream carry service flows of different types.

Based on the foregoing design solution, in another possible design, a location of the Alloc-ID1 relative to the Alloc-ID2 is fixed in a BWMap message in each period.

In a second design solution, a bandwidth allocation method is provided, and the method includes sending a BWMap request to an OLT to request the OLT to allocate bandwidth, and receiving a BWMap message returned by the OLT, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the ONU1.

In this design solution, after such design, bandwidth authorization may be allocated to video data of the ONU1 twice in one period in order to transmit the video data. One transmission period is generally 125 $\mu s$. That is, within the 125 $\mu s$ seconds, the video data may be transmitted twice. If one period is 125 $\mu s$, a transmission time corresponding to each T-CONT is 125/6 that is approximately 21 $\mu s$, that is, a time interval between transmitting the video data for a first time and transmitting the video data for a next time is 63 µs. However, in an existing DBA transmission mechanism, if the ONU1 transmits the video data only once within 125 µs, a time interval between transmitting the video data for a current time and transmitting the video data for a next time is 125 µs, and if the ONU1 misses this time of data transmission, the ONU1 needs to wait for 125 µs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

Based on the foregoing design solution, in a possible design, the method further includes obtaining, according to an Alloc-ID of the ONU1, a first time and a second time corresponding to the ONU1, and transmitting first data according to the obtained first time, and transmitting second data according to the second time.

Based on the foregoing design solution, in another possible design, the BWMap message further includes an Alloc-ID3 and a third time corresponding to the Alloc-ID3, the Alloc-ID3 is used to identify an ONU2, and the third time is used to be allocated to the ONU2 for use.

Based on the foregoing design solution, in a possible design, the first time includes a start time 1 and an end time 1, the second time includes a start time 2 and an end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the end time 2 is used to indicate a byte at which the ONU1 ends transmission of the second data stream, and the first data stream and the second data stream carry service flows of a same type, or the first data stream and the second data stream carry service flows of different types.

Based on the foregoing design solution, in another possible design, a location of the Alloc-ID1 relative to the Alloc-ID2 is fixed in a BWMap message in each period.

In a third design solution, an OLT is provided, and the OLT includes a transceiver configured to receive a bandwidth request sent by each ONU, where the ONU includes an ONU1, and send a BWMap message to each ONU, and a processor configured to generate the BWMap message according to bandwidth requested by the ONU and bandwidth configured for the ONU, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the ONU1 for use.

In this design solution, after such design, bandwidth authorization may be allocated to video data of the ONU1 twice in one period in order to transmit the video data. One transmission period is generally 125 µs. That is, within the 125 µs seconds, the video data may be transmitted twice. If one period is 125 µs, a transmission time corresponding to each T-CONT is 125/6 that is approximately 21 µs, that is, a time interval between transmitting the video data for a first time and transmitting the video data for a next time is 63 µs. However, in an existing DBA transmission mechanism, if the ONU1 transmits the video data only once within 125 µs, a time interval between transmitting the video data for a current time and transmitting the video data for a next time is 125 µs, and if the ONU1 misses this time of data transmission, the ONU1 needs to wait for 125 µs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

Based on the third design solution, in a possible design, the BWMap message further includes an Alloc-ID3 and a third time corresponding to the Alloc-ID3, the Alloc-ID3 is used to identify an ONU2, and the third time is used to be allocated to the ONU2 for use.

Based on the third design solution, in another possible design, the first time includes a start time 1 and an end time 1, the second time includes a start time 2 and an end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the end time 2 is used to indicate a byte at which the ONU1 ends transmission of the second data stream, and the first data stream and the second data stream carry service flows of a same type, or the first data stream and the second data stream carry service flows of different types.

Based on the third design solution, in another possible design, a location of the Alloc-ID1 relative to the Alloc-ID2 is fixed in a BWMap message in each period.

In this design solution, after such design, bandwidth authorization may be allocated to video data of the ONU1 twice in one period in order to transmit the video data. One transmission period is generally 125 µs. That is, within the 125 µs seconds, the video data may be transmitted twice. If one period is 125 µs, a transmission time corresponding to each T-CONT is 125/6 that is approximately 21 µs, that is, a time interval between transmitting the video data for a first time and transmitting the video data for a next time is 63 µs. However, in an existing DBA transmission mechanism, if the ONU1 transmits the video data only once within 125 µs, a time interval between transmitting the video data for a current time and transmitting the video data for a next time is 125 µs, and if the ONU1 misses this time of data transmission, the ONU1 needs to wait for 125 µs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

In a fourth design solution, an ONU is provided, and the ONU includes a transmitter configured to send a bandwidth request to an OLT, and a receiver configured to receive a BWMap message returned by the OLT, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the ONU1.

Based on the fourth design solution, a possible implementation is provided, where the ONU further includes a processor configured to obtain, according to an Alloc-ID of the ONU1, a first time and a second time corresponding to the ONU1, and instruct the transmitter to transmit data in the first time and the second time, and the transmitter is further configured to transmit first data according to the obtained first time, and transmit second data according to the second time.

Based on the fourth design solution, another possible implementation is provided, where the BWMap message further includes an Alloc-ID3 and a third time corresponding to the Alloc-ID3, the Alloc-ID3 is used to identify an ONU2, and the third time is used to be allocated to the ONU2 for use.

Based on the fourth design solution, a third possible implementation is provided, where the first time includes a start time 1 and an end time 1, the second time includes a start time 2 and an end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the end time 2 is used to indicate a byte at which the ONU1 ends transmission of the second data stream, and the first data stream and the second data stream carry service flows of a same type, or the first data stream and the second data stream carry service flows of different types.

Based on the fourth design solution, a fourth possible implementation is provided, where a location of the Alloc-ID1 relative to the Alloc-ID2 is fixed in a BWMap message in each period.

In this design solution, after such design, bandwidth authorization may be allocated to video data of the ONU1 twice in one period in order to transmit the video data. One transmission period is generally 125 µs. That is, within the 125 µs seconds, the video data may be transmitted twice. If one period is 125 µs, a transmission time corresponding to each T-CONT is 125/6 that is approximately 21 µs, that is, a time interval between transmitting the video data for a first time and transmitting the video data for a next time is 63 µs. However, in an existing DBA transmission mechanism, if the ONU1 transmits the video data only once within 125 µs, a time interval between transmitting the video data for a current time and transmitting the video data for a next time is 125 µs, and if the ONU1 misses this time of data transmission, the ONU1 needs to wait for 125 µs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

In a fifth design solution, a PON system is provided, including an OLT and an ONU. The OLT is connected to the ONU using an ODN, the OLT includes the OLT related to the foregoing third design solution, and the ONU includes the ONU according to the foregoing design solution.

In this design solution, after such design, bandwidth authorization may be allocated to video data of the ONU1 twice in one period in order to transmit the video data. One transmission period is generally 125 µs. That is, within the 125 µs seconds, the video data may be transmitted twice. If one period is 125 µs, a transmission time corresponding to each T-CONT is 125/6 that is approximately 21 µs, that is, a time interval between transmitting the video data for a first time and transmitting the video data for a next time is 63 µs. However, in an existing DBA transmission mechanism, if the ONU1 transmits the video data only once within 125 µs, a time interval between transmitting the video data for a current time and transmitting the video data for a next time is 125 µs, and if the ONU1 misses this time of data transmission, the ONU1 needs to wait for 125 µs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

DESCRIPTION OF EMBODIMENTS

To make the objectives, technical solutions, and advantages of this application clearer, the following further describes the implementations of this application in detail with reference to the accompanying drawings.

"Multiple" described in this application means two or more. The term "and/or" describes an association relationship of associated objects and indicates that three relationships may exist. For example, A and/or B may represent the three cases that only A exists, both A and B exist, and only B exists. The character "/" generally indicates an "or" relationship between the associated objects.

Figure 1:
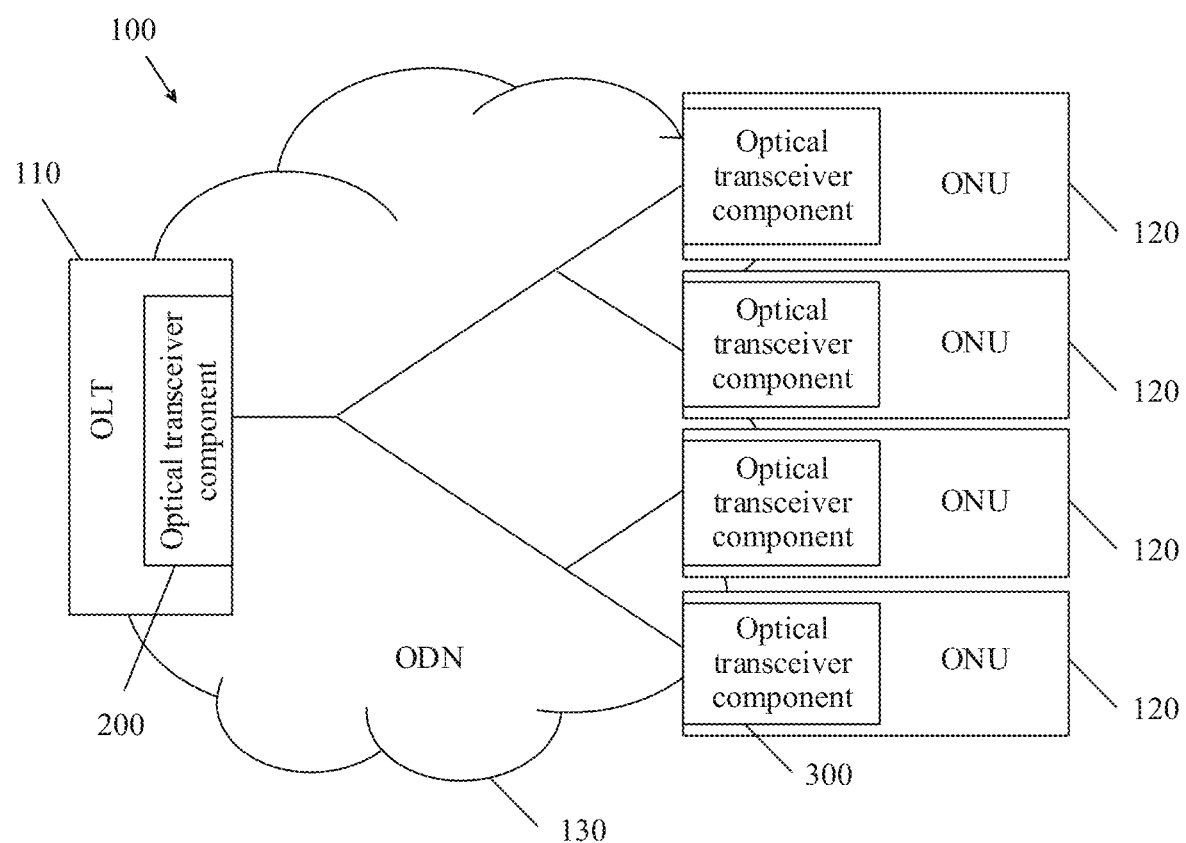
FIG. 1 is a system architecture diagram of a data communications system according to an embodiment of this application.

Referring to FIG. 1, a PON system 100 includes at least one OLT 110, multiple ONUs 120, and an ODN 130. The OLT 110 is connected to the multiple ONUs 120 in a point-to-multipoint manner using the ODN 130. The OLT 110 may communicate with the ONU 120 using a time division multiplexing (TDM) mechanism, a wavelength division multiplexing (WDM) mechanism, or a TDM/WDM hybrid mechanism. A direction from the OLT 110 to the ONU 120 is defined as a downstream direction, and a direction from the ONU 120 to the OLT 110 is an upstream direction.

The PON system 100 may be a communications network that does not need any active component to distribute data between the OLT 110 and the ONU 120. In a specific embodiment, the data may be distributed between the OLT 110 and the ONU 120 using a passive optical component (such as an optical splitter) in the ODN 130. The PON system 100 may be an asynchronous transfer mode (ATM) PON system or a broadband PON (BPON) system defined in the International Telecommunication Union Telecommunication Standardization Sector (ITU-T) G.983 standard, a gigabit PON (GPON) system defined in the ITU-T G.984 series of standards, an Ethernet PON (EPON) system defined in the Institute of Electrical and Electronics Engineers IEEE 802.3ah standard, a WDM PON system, or a next-generation (NGA) PON system such as an XGPON system defined in the ITU-T G.987 series of standards, a 10 gigabit (10G) EPON system defined in the IEEE 802.3av standard, or a TDM/WDM hybrid PON system. Various PON systems defined by the foregoing standards are incorporated in this application document by reference in their entireties.

The OLT 110 is usually located at a central location (such as a CO), and may manage all the multiple ONUs 120. The OLT 110 may be used as a medium between the ONU 120 and an upper-layer network (not shown), use data received from the upper-layer network as downstream data, forward the downstream data to the ONUs 120, and forward upstream data received from the ONU 120 to the upper-layer network. Specific structure configuration of the OLT 110 may vary with a specific type of the PON 100. In an embodiment, the OLT 110 may include an optical transceiver component 200 and a data processing module (not shown). The optical transceiver component 200 may convert downstream data processed by the data processing module into a downstream optical signal, send the downstream optical signal to the ONU 120 using the ODN 130, receive an upstream optical signal sent by the ONU 120 using the ODN 130, convert the upstream optical signal into an electrical signal, and provide the electrical signal for the data processing module for processing.

The ONUs 120 may be disposed at user side locations (such as customer residences) in a distributed manner. The ONU 120 may be a network device configured to communicate with the OLT 110 and a user. Further, the ONU 120 may be used as a medium between the OLT 110 and the user. For example, the ONU 120 may forward downstream data received from the OLT 110 to the user, and set data received from the user as upstream data and forward the upstream data to the OLT 110. Specific structure configuration of the ONU 120 may vary with a specific type of the PON 100. In an embodiment, the ONUs 120 may include an optical transceiver component 300. The optical transceiver component 300 is configured to receive a downstream data signal sent by the OLT 110 using the ODN 130, and send an upstream data signal to the OLT 110 using the ODN 130. It should be understood that, in this application document, a structure of the ONU 120 is similar to that of the optical network terminal (ONT). Therefore, in a solution in this application document, the ONU and the ONT may be interchanged.

The ODN 130 may be a data distribution system, and may include a fiber, an optical coupler, an optical multiplexer/demultiplexer, an optical splitter, and/or another device. In an embodiment, the fiber, the optical coupler, the optical multiplexer/demultiplexer, the optical splitter, and/or the other device may be passive optical components. Further, the fiber, the optical coupler, the optical multiplexer/demultiplexer, the optical splitter, and/or the other device may be components that do not need to be supported by a power supply when data signals are distributed between the OLT 110 and the ONUs 120. In addition, in another embodiment, the ODN 130 may further include one or more processing devices, such as an optical amplifier or a relay device. In a branch structure shown in FIG. 1, the ODN 130 may be further extended to the multiple ONUs 120 from the OLT 110, but may also be configured as any other point-to-multipoint structure.

The optical transceiver component 200 or 300 may be a pluggable optical transceiver component integrated with an optical signal transmitting and receiving function, an optical-to-electrical conversion function, and an Optical Time Domain Reflectometer (OTDR) testing function. The optical transceiver component 200 of the OLT 110 is used as an example, and the optical transceiver component 200 may include an optical transmitting module (not shown), an optical receiving module (not shown), and an OTDR testing module (not shown). The optical transmitting module is configured to deliver a downstream data signal to the ONU 120 using the ODN 130, modulate an OTDR testing signal to the downstream data signal according to the OTDR testing control signal provided by the OTDR testing module when a fiber network and a PON device need to be detected, and output the downstream data signal to the ODN 130. The optical receiving module is configured to receive an upstream data signal that is from the ONU 120 and that is transmitted using the ODN 130, convert the upstream data signal into an electrical signal by means of optical-to-electrical conversion, and forward the electrical signal to a control module or a data processing module (not shown) of the OLT 110 for processing.

It should be noted that, the PON system in FIG. 1 may be an EPON system or a GPON system, or may be a 10G EPON system or a 100G EPON system, or may be an 10G-PON (XG-PON) system, an XG-Symmetrical PON (XGS-PON) system, or a time and wavelength division multiplexed PON (TWDM-PON) system. This is not limited in this embodiment of this application.

Various bandwidth allocation methods described below are applicable to the foregoing system in FIG. 1.

Figure 2:
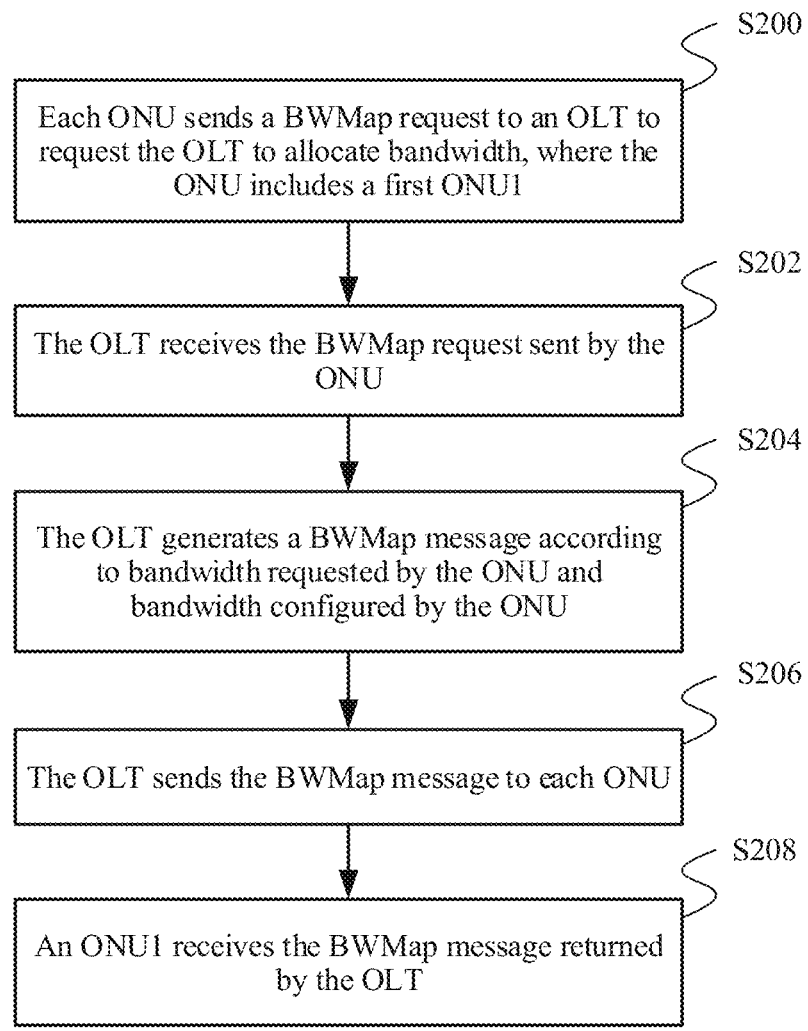
FIG. 2 is a schematic flowchart of a bandwidth allocation method according to an embodiment of this application.

Referring to FIG. 2, FIG. 2 is a bandwidth allocation method, applied to the foregoing system architecture in FIG. 1.

The method includes the following steps.

Step S200: Each ONU sends a BWMap request to an OLT to request the OLT to allocate bandwidth, where the ONU includes an ONU1.

Step S202: The OLT receives the BWMap request sent by the ONU.

Step S204: The OLT generates a BWMap message according to bandwidth requested by the ONU and bandwidth configured by the ONU, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the ONU1 for use.

Further, the first time includes a first start time start time 1 and a first end time end time 1, the second time includes a second start time start time 2 and a second end time end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the second end time end time 2 is used to indicate a byte at which the ONU1 ends transmission of the second data stream, and the first data stream and the second data stream carry service flows of a same type, or the first data stream and the second data stream carry service flows of different types.

Further, the BWMap message further includes an Alloc-ID3 and a third time corresponding to the Alloc-ID3, the Alloc-ID3 is used to identify a second ONU2, and the third time is used to be allocated to the ONU2 for use.

Figure 3:
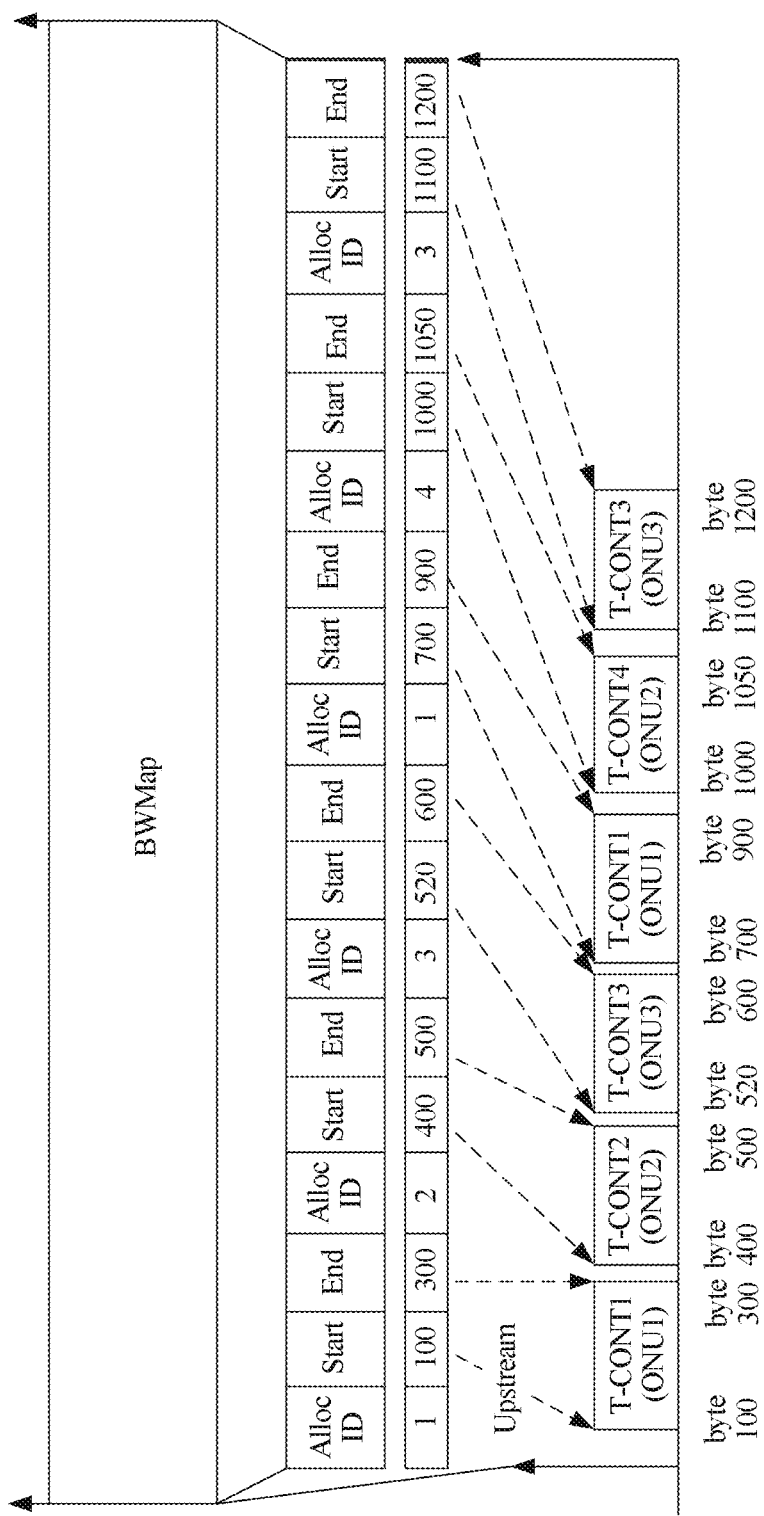
FIG. 3 shows a BWMap message format according to an embodiment of this application.

A specific format of the BWMap message generated by the OLT is shown in FIG. 3.

The BWMap message includes an Alloc-ID field, a start time (designated as Start in FIG. 3) field, and an end time (designated as in FIG. 3) field. The Alloc-ID field is used to identify a T-CONT allocated to each ONU, and the T-CONT is a container used to transmit data, and further indicates bytes of data streams that can be transmitted. The start time field is used to indicate a time corresponding to a byte at which the T-CONT starts to carry data, and the end time field is used to indicate a time corresponding to a byte at which the T-CONT ends carrying of the data. Because each ONU has a fixed transmission rate, and a transmission capacity corresponding to each ONU is also preconfigured, a time corresponding to a start byte of the ONU and a time at which the ONU ends sending of a to-be-transmitted byte may be learned according to the transmission rate and a quantity of to-be-transmitted data bytes. Descriptions herein are consistent with descriptions of an ITU-T G.984.3 BWMap field and an ITU-T G.987.3 BWMap field, and details are not described herein.

As shown in FIG. 3, that the OLT generates a BWMap message including the Alloc-ID1 is used to identify a T-CONT1 allocated to the ONU1, a start time 100 and an end time 300 indicate that the ONU1 starts to send data at the $100^{th}$ byte and ends sending of the data at the $300^{th}$ byte, the T-CONT1 is used to carry a data capacity of 200 bytes, and the T-CONT1 is used to carry data of the ONU1. The Alloc-ID2 is used to identify a T-CONT2 allocated to the ONU2, a start time 400 and an end time 500 indicate that the ONU2 starts to send data at the $400^{th}$ byte and ends sending of the data at the $500^{th}$ byte, the T-CONT2 is used to carry a data capacity of 100 bytes, and the T-CONT2 is used to carry data of the ONU2. The Alloc-ID3 is used to identify a T-CONT3 allocated to a third ONU (ONU3), a start time 520 and an end time 600 indicate that the ONU3 starts to send data at the $520^{th}$ byte and ends sending of the data at the $600^{th}$ byte, the T-CONT3 is used to carry a data capacity of 80 bytes, and the T-CONT3 is used to carry data of the ONU3. Implementation of this BWMap message is different from implementation of existing BWMap message. The BWMap message in this period further includes that the Alloc-ID1 is used to identify a T-CONT1 allocated to the ONU1, a start time 700 and an end time 900 indicate that the ONU1 starts to send data at the $700^{th}$ byte and ends sending of the data at the $900^{th}$ byte, the T-CONT1 is used to carry a data capacity of 200 bytes, and the T-CONT1 is used to carry data of the ONU1. In one BWMap message in one period, bandwidth authorization may be allocated to the data of the ONU1 twice in a specified time, and the data transmitted by the ONU1 may be data of a same service type, or may be data of different service types. For example, video data of the ONU1 may be separately carried by the T-CONT1 and the T-CONT2, the video data starts to be transmitted at the $100^{th}$ byte, transmission of the video data stops at the $300^{th}$ byte, the video data starts to be transmitted again at the $700^{th}$ byte, and transmission of the video data ends at the $900^{th}$ byte.

After such design, bandwidth authorization may be allocated to the video data of the ONU1 twice in one period in order to transmit the video data. One transmission period is generally 125 μs. That is, within the 125 μs seconds, the video data may be transmitted twice. If one period is 125 μs, a transmission time corresponding to each T-CONT is 125/6 that is approximately 21 μs, that is, a time interval between transmitting the video data for a first time and transmitting the video data for a next time is 63 μs. However, in an existing DBA transmission mechanism, if the ONU1 transmits the video data only once within 125 μs, a time interval between transmitting the video data for a current time and transmitting the video data for a next time is 125 μs, and if the ONU1 misses this time of data transmission, the ONU1 needs to wait for 125 μs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 μs such that a problem that a transmission delay does not satisfy a requirement when a PON system is applied to mobile backhaul is resolved, a data transmission rate and data transmission efficiency are improved, and user satisfaction is improved.

Further, the OLT generates a BWMap message, that may further include a fourth allocation identifier (Alloc-ID4) used to identify a T-CONT4 allocated to the ONU2, a start time 1000 and an end time 1050 indicate that the ONU2 starts to send data at the $1000^{th}$ byte and ends sending of the data at the $1050^{th}$ byte, the T-CONT4 is used to carry a data capacity of 50 bytes, and the T-CONT4 is used to carry data of the ONU2. In such design, in one BWMap message in one period, the ONU2 may separately transmit data of different types in a specified time, or may transmit data of a same service type. For example, video data of the ONU2 may be carried by the T-CONT4, the video data starts to be transmitted at the $1000^{th}$ byte, and transmission of the video data ends at the $1050^{th}$ byte, or the ONU2 may start to transmit network access data at the $1000^{th}$ byte, and end transmission of the network access data at the $1050^{th}$ byte. In such design, for the ONU2 and data of different service types, a transmission time of to-be-transmitted data of various service types in the ONU2 is also greatly reduced, a data transmission delay of the ONU2 is greatly reduced, and a requirement that a transmission delay of each ONU in such design is within 20 μs is satisfied such that a transmission rate and transmission efficiency of the data of the various service types are improved, and user satisfaction is improved.

Figure 4:
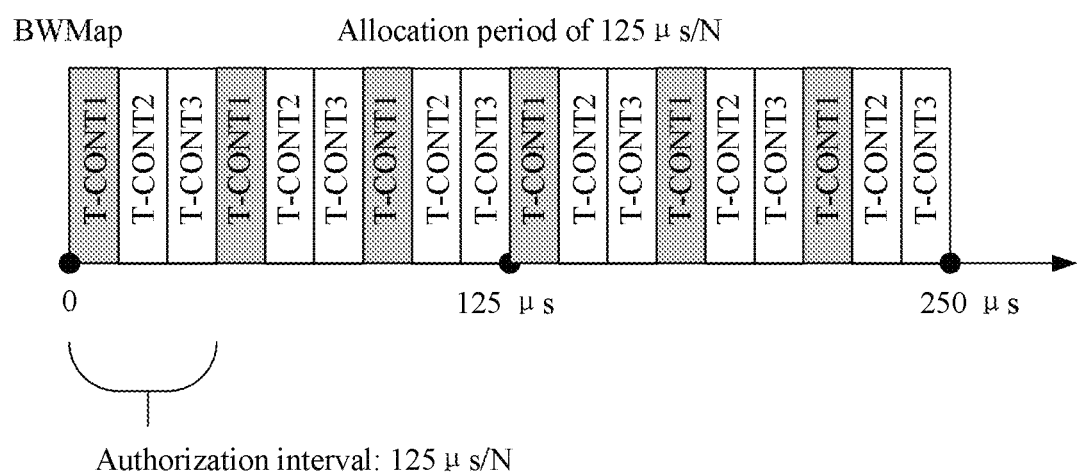
FIG. 4 is a diagram of an allocation period corresponding to a BWMap message according to an embodiment of this application.

Corresponding to descriptions in the foregoing embodiment, an allocation period corresponding to the BWMap message is shown in FIG. 4. The allocation period is described using an example in which each existing period is 125 μs, but is not limited to the period. When the allocation period is 125 μs, a time corresponding to each T-CONT is 125/6 that is approximately 21 μs, that is, it takes the T-CONT1 approximately 21 μs to transmit data once. A time interval from transmitting data by the ONU1 μsing the T-CONT1 to transmitting data using the T-CONT1 for a next time is 21×3 that is 63 μs. Within 125 μs, the T-CONT1 may be used to carry to-be-sent data of the ONU1 twice. That is, in comparison with other approaches, in one period, a transmission time interval of data transmission of the ONU is reduced from 125 μs to 63 μs. Therefore, using the design, a calculated average delay of the ONU1 can also be reduced to within 20 μs.

Figure 5A:
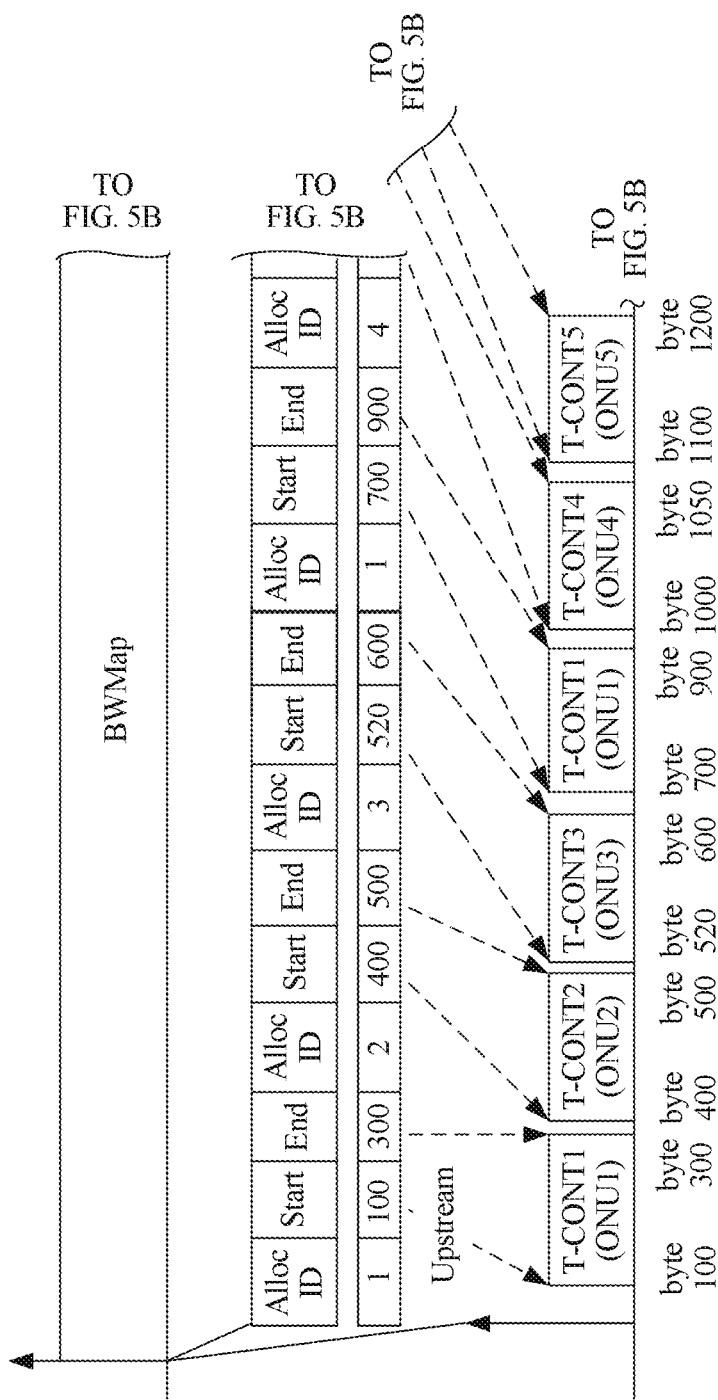
FIG. 5A and FIG. 5B show a BWMap message format according to an embodiment of this application.
Figure 5B:
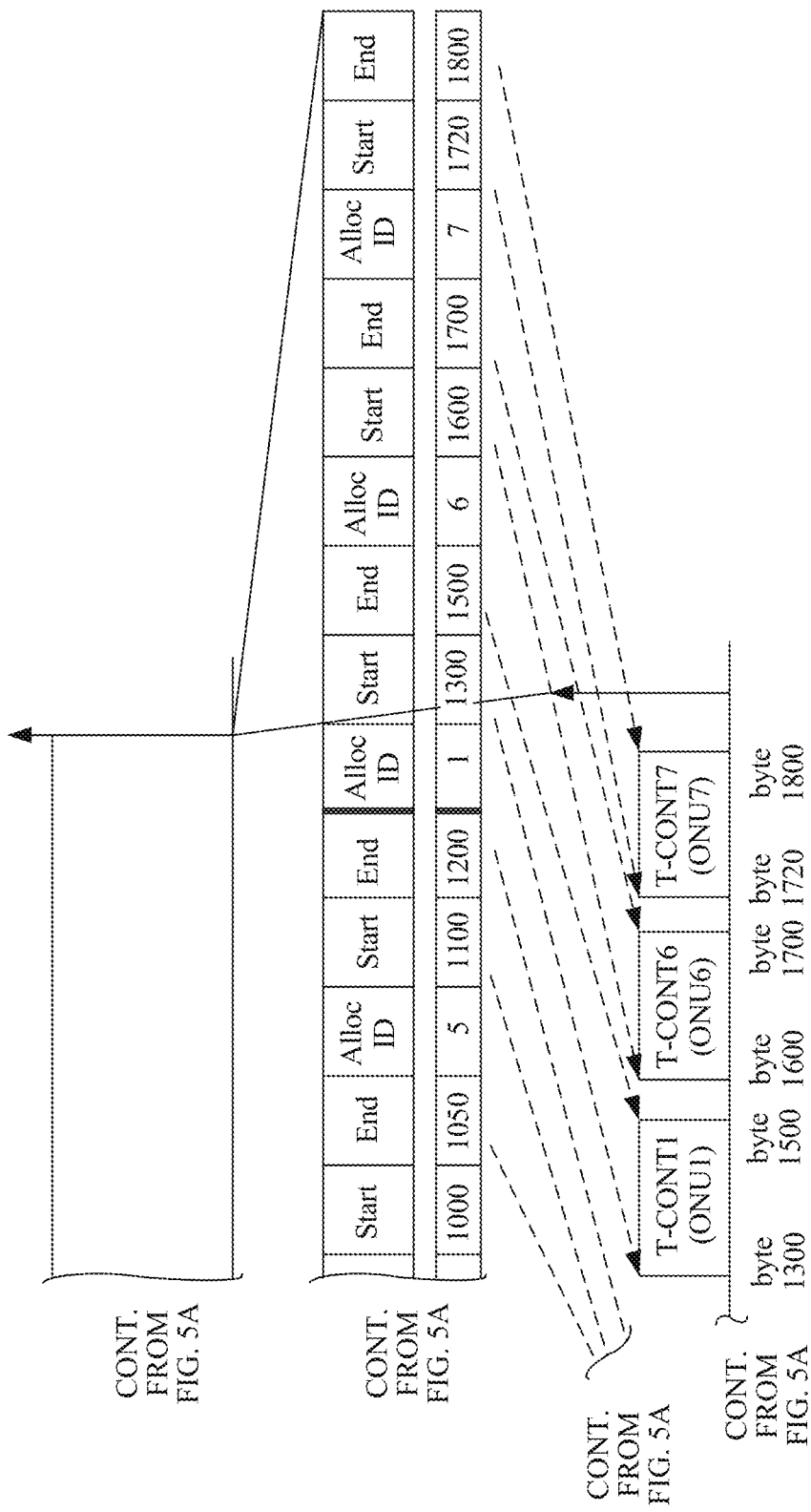

As shown in FIG. 5A and FIG. 5B, alternatively, the BWMap message generated by the OLT may be further in a message format shown in FIG. 5A and FIG. 5B. A difference from FIG. 4 is that, in the BWMap message format shown in FIG. 5A and FIG. 5B, in addition to allocating bandwidth authorization to the T-CONT1 of the ONU1 twice, the OLT may further allocate bandwidth authorization to the ONU2 and the ONU3 or the ONU4 once. This BWMap message format may be compatible with a format in which bandwidth authorization is allocated to the ONU1 twice in FIG. 5A and FIG. 5B, and may also be compatible with a format in which bandwidth authorization is allocated to another ONU once in an existing BWMap message. Details are as follows.

The Alloc-ID1 is used to identify a T-CONT1 allocated to the ONU1, a start time 100 and an end time 300 indicate that the ONU1 starts to send data at the $100^{th}$ byte and ends sending of the data at the $300^{th}$ byte, the T-CONT1 is used to carry a data capacity of 200 bytes, and the T-CONT1 is used to carry data of the ONU1. The Alloc-ID2 is used to identify a T-CONT2 allocated to the ONU2, a start time 400 and an end time 500 indicate that the ONU2 starts to send data at the $400^{th}$ byte and ends sending of the data at the $500^{th}$ byte, the T-CONT2 is used to carry a data capacity of 100 bytes, and the T-CONT2 is used to carry data of the ONU2. The Alloc-ID3 is used to identify a T-CONT3 allocated to an ONU3, a start time 520 and an end time 600 indicate that the ONU3 starts to send data at the $520^{th}$ byte and ends sending of the data at the $600^{th}$ byte, the T-CONT3 is used to carry a data capacity of 80 bytes, and the T-CONT3 is used to carry data of the ONU3. The BWMap message in this period further includes that the Alloc-ID1 is used to identify a T-CONT1 allocated to the ONU1, a start time 700 and an end time 900 indicate that the ONU1 starts to send data at the $700^{th}$ byte and ends sending of the data at the $900^{th}$ byte, the T-CONT1 is used to carry a data capacity of 200 bytes, and the T-CONT1 is used to carry data of the ONU1. In one BWMap message in one period, bandwidth authorization may be allocated to the data of the ONU1 twice in a specified time, and the data transmitted by the ONU1 may be data of a same service type, or may be data of different service types. For example, video data of the ONU1 may be separately carried by the T-CONT1 and the T-CONT2, the video data starts to be transmitted at the $100^{th}$ byte, transmission of the video data ends at the $300^{th}$ byte, the video data starts to be transmitted again at the $700^{th}$ byte, and transmission of the video data ends at the $900^{th}$ byte.

After such design, bandwidth authorization may be allocated to the video data of the ONU1 twice in one period in order to transmit the video data. One transmission period is generally 125 μs. That is, within the 125 μs seconds, the video data may be transmitted twice. If one period is 125 μs, a transmission time corresponding to each T-CONT is 125/6 that is approximately 21 μs, that is, a time interval between transmitting the video data for a first time and transmitting the video data for a next time is 63 μs. However, in an existing DBA transmission mechanism, if the ONU1 transmits the video data only once within 125 μs, a time interval between transmitting the video data for a current time and transmitting the video data for a next time is 125 μs, and if the ONU1 misses this time of data transmission, the ONU1 needs to wait for 125 μs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 μs such that a problem that a transmission delay does not satisfy a requirement when a PON system is applied to mobile backhaul is resolved, a data transmission rate and data transmission efficiency are improved, and user satisfaction is improved.

Further, that the OLT generates a BWMap message may further include an Alloc-ID4 is used to identify a T-CONT4 allocated to an ONU4, a start time 1000 and an end time 1050 indicate that the ONU4 starts to send data at the $1000^{th}$ byte and ends sending of the data at the $1050^{th}$ byte, the T-CONT4 is used to carry a data capacity of 50 bytes, and the T-CONT4 is used to carry data of the ONU4. In such design, it indicates that the BWMap message may allocate bandwidth authorization to the ONU1 twice in one period, and after fixed bandwidth authorization is allocated to each ONU, may further be compatible with an existing bandwidth allocation mechanism, and remaining bandwidth is used by another ONU to which bandwidth authorization is allocated only once, such as start bytes and end bytes of bandwidth authorization shown by an Alloc-ID5, an Alloc-ID6, and an Alloc-ID7. In such design, a bandwidth allocation period of the ONU1 is 125 μs/N, while a bandwidth allocation period of the ONU4 is 125 μs. The system is allowed to support this case. Therefore, a transmission time of to-be-transmitted data of various service types in each ONU is greatly shortened, a data transmission delay of the system is greatly reduced, and a requirement that a transmission delay of each ONU in such design is within 20 μs is satisfied such that a transmission rate and transmission efficiency of the data of the various service types are improved, and user satisfaction is improved.

Figure 6:
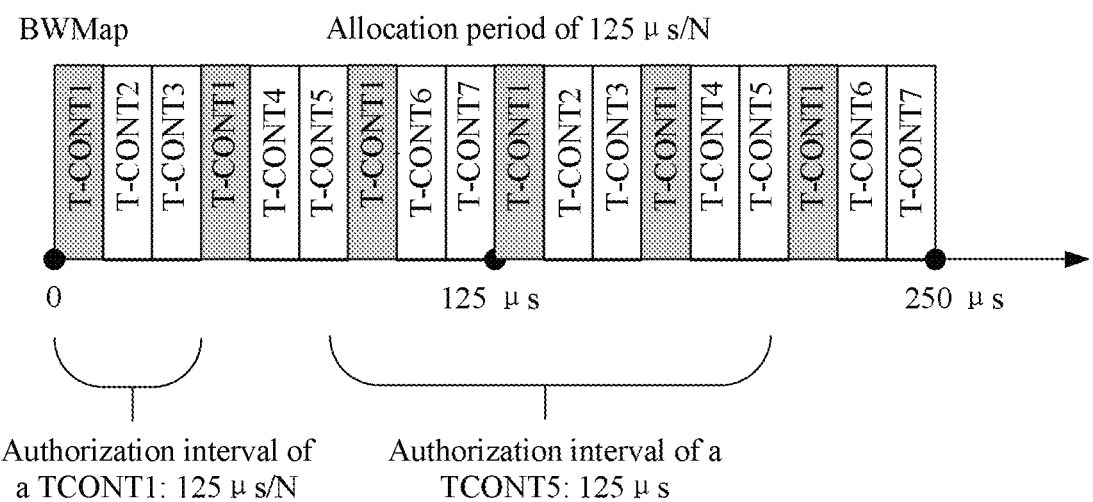
FIG. 6 is a diagram of an allocation period corresponding to a BWMap message according to an embodiment of this application.

Corresponding to descriptions in the foregoing embodiment, an allocation period corresponding to the BWMap message is shown in FIG. 6, and the T-CONT1 carries the data of the ONU1. In addition, descriptions of bandwidth authorization corresponding to the existing DBA allocation mechanism are added, such as the Alloc-ID2, the Alloc-ID3, the Alloc-ID4, and the fifth allocation identifier (Alloc-ID5). The allocation period is described using an example in which each existing period is 125 μs, but is not limited to the period. When the allocation period is 125 μs, a time corresponding to each T-CONT is 125/6 that is approximately 21 μs, that is, it takes the T-CONT1 approximately 21 μs to transmit data once. A time interval from transmitting data by the ONU1 μsing the T-CONT1 to transmitting data using the T-CONT1 for a next time is 21×3 that is 63 μs. Within 125

μs, the T-CONT1 may be used to carry bandwidth authorization allocated to the ONU1 twice. That is, in comparison with the other approaches, a bandwidth authorization timeslot of the ONU1 is smaller, and in one period, a transmission time interval of each time of data transmission of the ONU is reduced from 125 μs to 63 μs. Therefore, using the design, a calculated average delay of the ONU1 can also be reduced to within 20 μs.

Figure 7A:
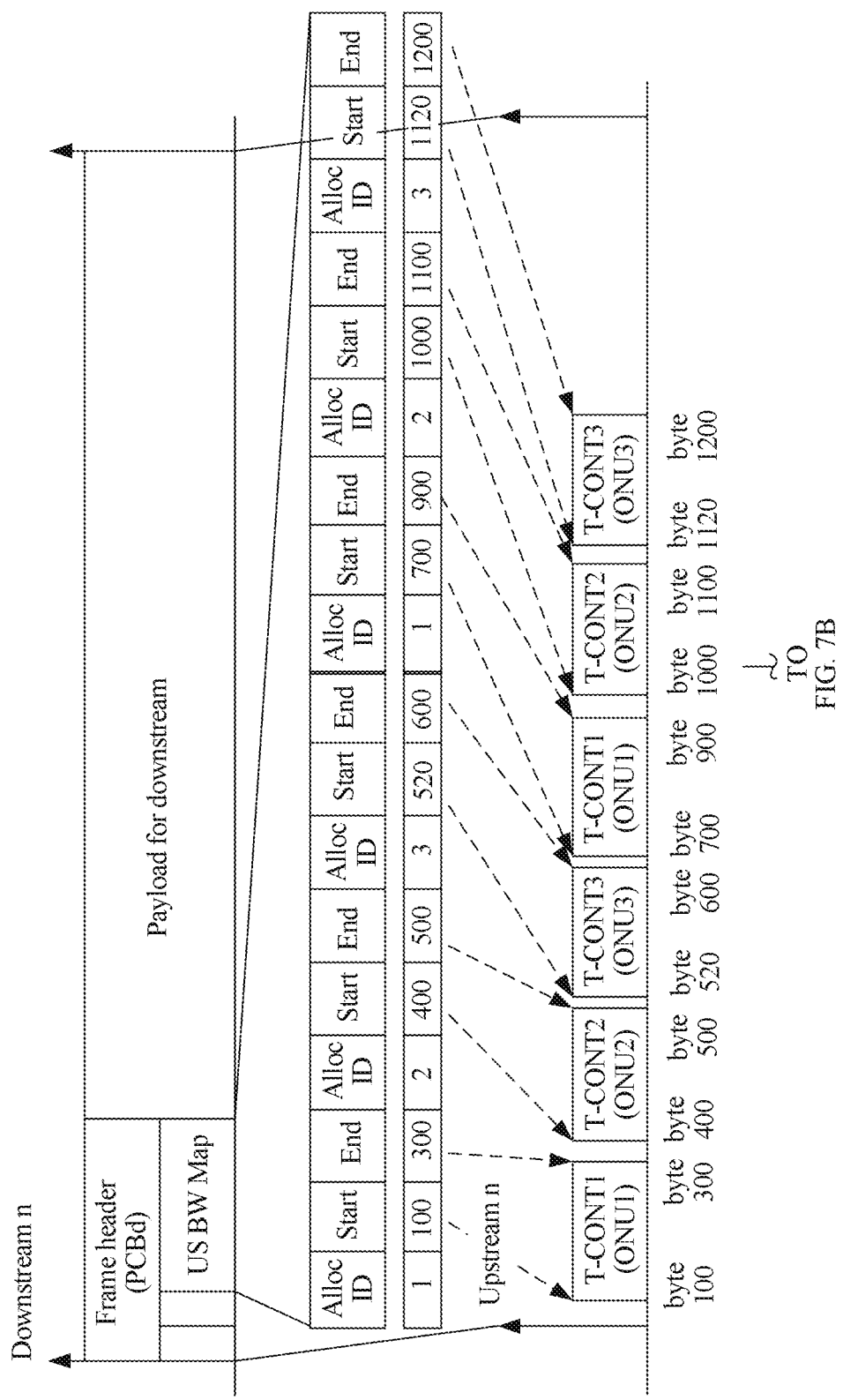
FIG. 7A and FIG. 7B show another BWMap message format according to an embodiment of this application.
Figure 7B:
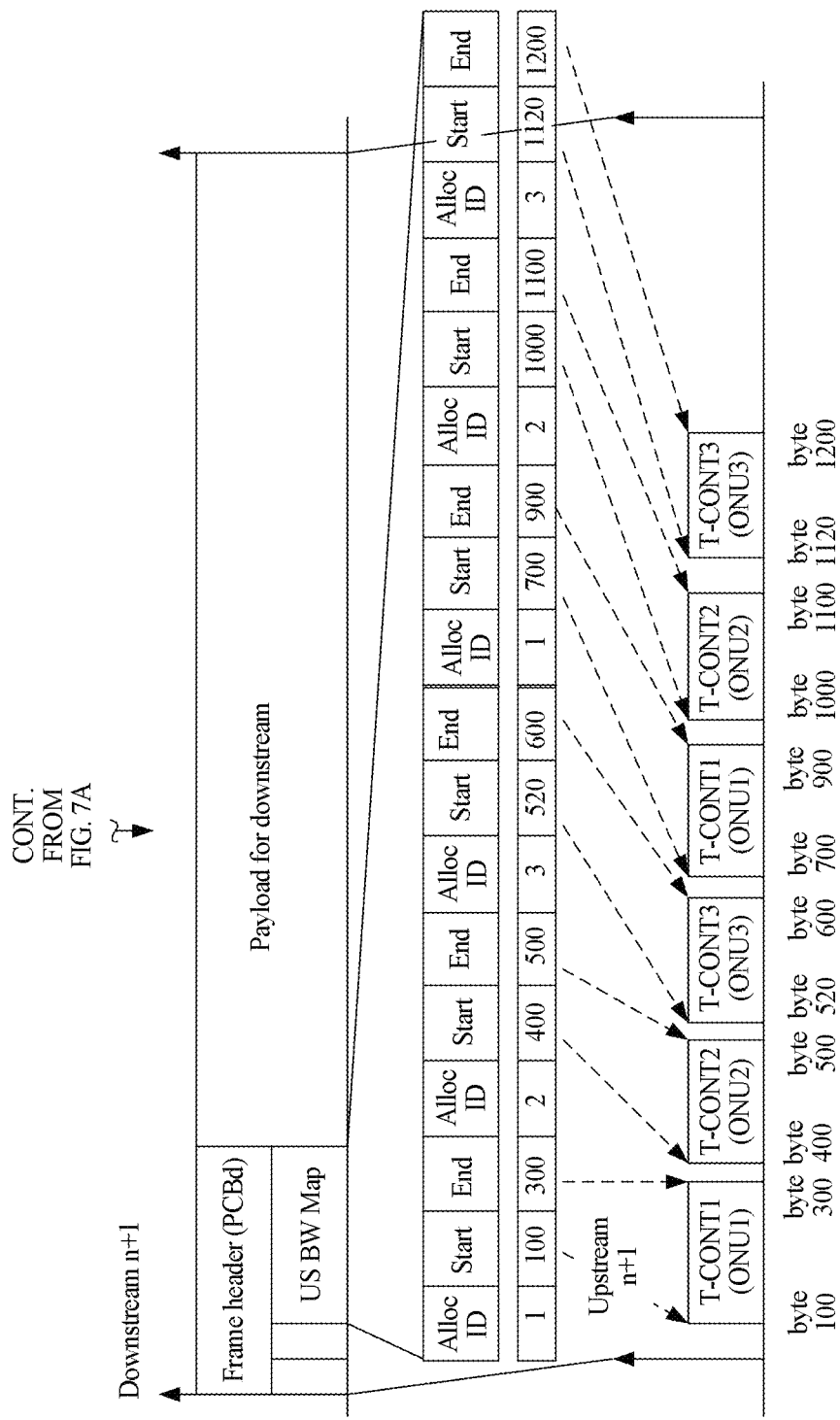

FIG. 7A and FIG. 7B show another BWMap message format, the message format is basically the same as the foregoing two BWMap message formats, and a relative location of each field in the message format is also the same as a relative location of each field in the foregoing two BWMap message.

FIG. 7A and FIG. 7B show a format of a downstream frame n that is delivered by the OLT to the ONU, and the downstream frame includes a frame header and a frame payload. An upstream BWMap (US BWMap) message format is located at a frame header part of the downstream frame n, and details are as follows.

The Alloc-ID1 is used to identify a T-CONT1 allocated to the ONU1, a start time 100 and an end time 300 indicate that the ONU1 starts to send data at the $100^{th}$ byte and ends sending of the data at the $300^{th}$ byte, the T-CONT1 is used to carry a data capacity of 200 bytes, and the T-CONT1 is used to carry data of the ONU1. The Alloc-ID2 is used to identify a T-CONT2 allocated to the ONU2, a start time 400 and an end time 500 indicate that the ONU2 starts to send data at the $400^{th}$ byte and ends sending of the data at the $500^{th}$ byte, the T-CONT2 is used to carry a data capacity of 100 bytes, and the T-CONT2 is used to carry data of the ONU2. The Alloc-ID3 is used to identify a T-CONT3 allocated to an ONU3, a start time 520 and an end time 600 indicate that the ONU3 starts to send data at the $520^{th}$ byte and ends sending of the data at the $600^{th}$ byte, the T-CONT3 is used to carry a data capacity of 80 bytes, and the T-CONT3 is used to carry data of the ONU3. Implementation of this BWMap message is different from implementation of existing BWMap message. The BWMap message in this period further includes that the Alloc-ID1 is used to identify a T-CONT1 allocated to the ONU1, a start time 700 and an end time 900 indicate that the ONU1 starts to send data at the $700^{th}$ byte and ends sending of the data at the $900^{th}$ byte, the T-CONT1 is used to carry a data capacity of 200 bytes, and the T-CONT1 is used to carry data of the ONU1. In one BWMap message in one period, bandwidth authorization may be allocated to the data of the ONU1 twice in a specified time, and the data transmitted by the ONU1 may be data of a same service type, or may be data of different service types. For example, video data of the ONU1 may be separately carried by the T-CONT1 and the T-CONT2, the video data starts to be transmitted at the $100^{th}$ byte, transmission of the video data ends at the $300^{th}$ byte, the video data starts to be transmitted again at the $700^{th}$ byte, and transmission of the video data ends at the $900^{th}$ byte.

After such design, bandwidth authorization may be allocated to the video data of the ONU1 twice in one period in order to transmit the video data. One transmission period is generally 125 μs. That is, within the 125 μs seconds, the video data may be transmitted twice. If one period is 125 μs, a transmission time corresponding to each T-CONT is 125/6 that is approximately 21 μs, that is, a time interval between transmitting the video data for a first time and transmitting the video data for a next time is 63 μs. However, in an existing DBA transmission mechanism, if the ONU1 transmits the video data only once within 125 μs, a time interval between transmitting the video data for a current time and transmitting the video data for a next time is 125 μs, and if the ONU1 misses this time of data transmission, the ONU1 needs to wait for 125 μs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 μs such that a problem that a transmission delay does not satisfy a requirement when a PON system is applied to mobile backhaul is resolved, a data transmission rate and data transmission efficiency are improved, and user satisfaction is improved.

Further, that the OLT generates a BWMap message may further include an Alloc-ID4 is used to identify a T-CONT4 allocated to the ONU2, a start time 1000 and an end time 1050 indicate that the ONU2 starts to send data at the $1000^{th}$ byte and ends sending of the data at the $1050^{th}$ byte, the T-CONT4 is used to carry a data capacity of 50 bytes, and the T-CONT4 is used to carry data of the ONU2. In such design, in one BWMap message in one period, the ONU2 may separately transmit data of different types in a specified time, or may transmit data of a same service type. For example, video data of the ONU2 may be carried by the T-CONT4, the video data starts to be transmitted at the $1000^{th}$ byte, and transmission of the video data ends at the $1050^{th}$ byte, or the ONU2 may start to transmit network access data at the $1000^{th}$ byte, and end transmission of the network access data at the $1050^{th}$ byte. In such design, for the ONU2 and data of different service types, a transmission time of to-be-transmitted data of various service types in the ONU2 is also greatly reduced, a data transmission delay of the ONU2 is greatly reduced, and a requirement that a transmission delay of each ONU in such design is within 20 μs is satisfied such that a transmission rate and transmission efficiency of the data of the various service types are improved, and user satisfaction is improved.

According to the foregoing descriptions with reference to the accompanying drawings, in two successive times of bandwidth authorization, the Alloc-ID1 indicates a T-CONT allocated to the ONU1. In a next period, a location of the Alloc-ID1 is also relatively fixed. Therefore, according to a DBA mechanism of an improved BWMap message format, a transmission delay between the ONU and the OLT can be reduced, and transmission efficiency and a transmission rate are improved.

Step S206: The OLT sends the BWMap message to each ONU.

Further, the OLT broadcasts the BWMap message to each ONU.

Step S208: The ONU1 receives the BWMap message returned by the OLT.

Further, the method may further include the following steps (not shown).

Step S210: The ONU1 obtains, according to an Alloc-ID of the ONU1, a first time and a second time corresponding to the ONU1.

Step S212: Transmit first data according to the obtained first time, and transmit second data according to the second time.

Further, the OLT pre-allocates an Alloc-ID to each ONU using a management configuration message, and the ONU receives and saves the Alloc-ID of the ONU. When the ONU1 receives the BWMap message sent by the OLT by means of broadcasting, each ONU obtains a T-CONT of the ONU according to an Alloc-ID of the ONU, and further obtains bandwidth authorization of the T-CONT, that is, obtains a first time corresponding to the T-CONT. If the ONU learns, by searching for an Alloc-ID, that bandwidth authorization is allocated to the ONU at least twice in one BWMap message in one period, the ONU transmits data separately according to a bandwidth authorization time in the message, that is, transmits the first data according to the obtained first time, and transmits the second data according to the second time. The first time corresponds to a byte at which data carried by the T-CONT starts to be sent and a byte at which sending of the data ends, and the second time corresponds to a byte at which data carried by the T-CONT starts to be sent and a byte at which sending of the data ends. The first time and the second time are allocated in ascending order.

After such design, bandwidth authorization may be allocated to the video data of the ONU1 twice in one period in order to transmit the video data. One transmission period is generally 125 μs. That is, within the 125 μs seconds, the video data may be transmitted twice. If one period is 125 μs, a transmission time corresponding to each T-CONT is 125/6 that is approximately 21 μs, that is, a time interval between transmitting the video data for a first time and transmitting the video data for a next time is 63 μs. However, in an existing DBA transmission mechanism, if the ONU1 transmits the video data only once within 125 μs, a time interval between transmitting the video data for a current time and transmitting the video data for a next time is 125 μs, and if the ONU1 misses this time of data transmission, the ONU1 needs to wait for 125 μs to perform transmission for a second time. It can be learned that, according to such improvement on a BWMap message format in this embodiment of this application, not only a service flow transmission interval of each ONU can be shortened, but also a transmission delay of the ONU is greatly reduced. It can be learned from an experiment that an average transmission delay of the ONU can be reduced to within 20 μs such that a problem that a transmission delay does not satisfy a requirement when a PON system is applied to mobile backhaul is resolved, a data transmission rate and data transmission efficiency are improved, and user satisfaction is improved.

Figure 8:
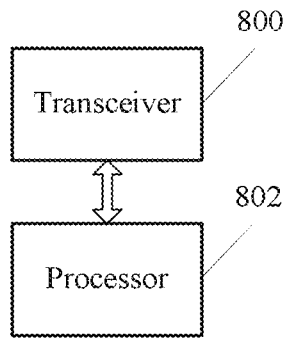
FIG. 8 is a schematic structural diagram of an OLT according to an embodiment of this application.

An embodiment of the present disclosure further provides an OLT. As shown in FIG. 8, the OLT includes a transceiver 800 configured to receive a bandwidth request sent by each ONU, where the ONU includes a first ONU1, and send a BWMap message to each ONU, and a processor 802 configured to generate the BWMap message according to bandwidth requested by the ONU and bandwidth configured by the ONU, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the ONU1 for use.

Further, the BWMap message further includes an Alloc-ID3 and a third time corresponding to the Alloc-ID3, the Alloc-ID3 is used to identify a second ONU2, and the third time is used to be allocated to the ONU2 for use.

Further, the first time includes a first start time start time 1 and a first end time end time 1, the second time includes a second start time start time 2 and a second end time end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the second end time end time 2 is used to indicate a byte at which the ONU1 ends transmission of the second data stream, and the first data stream and the second data stream carry service flows of a same type, or the first data stream and the second data stream carry service flows of different types.

Further, a location of the Alloc-ID1 relative to the Alloc-ID2 is fixed in a BWMap message in each period.

For the BWMap message generated by the OLT, refer to FIG. 2 to FIG. 7B and corresponding descriptions. Details are not described herein again.

For a location of the foregoing OLT in a PON system architecture, refer to the OLT shown in FIG. 1. The foregoing transceiver 800 may be the optical transceiver component 200 of the OLT 110 in the system architecture, or the transceiver 800 is located in the optical transceiver component 200 of the OLT in the system architecture.

According to improvement on a format of the BWMap message generated by the OLT in this embodiment of this application, not only a service flow transmission interval of each ONU can be shortened, but also a transmission delay of the ONU is greatly reduced. It can be learned from an experiment that an average transmission delay of the ONU can be reduced to within 20 μs such that a problem that a transmission delay does not satisfy a requirement when a PON system is applied to mobile backhaul is resolved, a data transmission rate and data transmission efficiency are improved, and user satisfaction is improved.

With reference to system architecture diagrams in FIG. 8 and FIG. 1, the OLT in FIG. 1 further includes the processor 802 shown in FIG. 8, and the processor 800 is not shown in FIG. 1. The processor 800 in FIG. 8 may be a media access controller (MAC) or another microprocessor.

Figure 9:
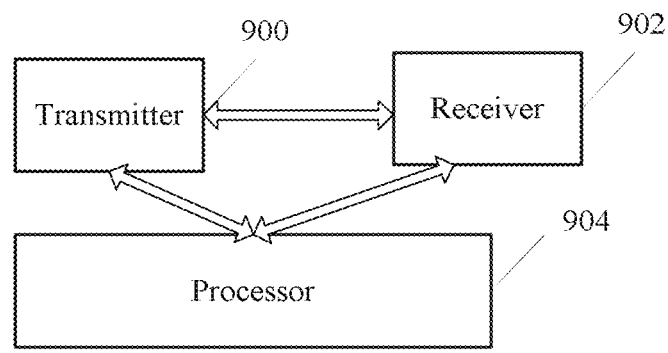
FIG. 9 is a schematic structural diagram of an ONU according to an embodiment of this application.

An embodiment of the present disclosure further provides an ONU. As shown in FIG. 9, the ONU includes a transmitter 900 configured to send a bandwidth request to an OLT, and a receiver 902 configured to receive a BWMap message returned by the OLT, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the first ONU1.

The ONU further includes a processor 904 configured to obtain, according to an Alloc-ID of the ONU1, a first time and a second time corresponding to the ONU1, and instruct the transmitter to transmit data in the first time and the second time.

The transmitter 900 is further configured to transmit first data according to the obtained first time, and transmit second data according to the second time.

The BWMap message further includes an Alloc-ID3 and a third time corresponding to the Alloc-ID3, the Alloc-ID3 is used to identify a second ONU2, and the third time is used to be allocated to the ONU2 for use.

Further, the first time includes a first start time start time 1 and a first end time end time 1, the second time includes a second start time start time 2 and a second end time end time 2, the start time 1 is used to indicate a byte at which the ONU1 starts to transmit a first data stream, the end time 1 is used to indicate a byte at which the ONU1 ends transmission of the first data stream, the start time 2 is used to indicate a byte at which the ONU1 starts to transmit a second data stream, the second end time end time 2 is used to indicate a byte at which the ONU1 ends transmission of the second data stream, and the first data stream and the second data stream carry service flows of a same type, or the first data stream and the second data stream carry service flows of different types.

Further, a location of the Alloc-ID1 relative to the Alloc-ID2 is fixed in a BWMap message in each period.

For a structure of the BWMap message received by the foregoing ONU, refer to FIG. 2 to FIG. 7B and corresponding descriptions. Details are not described herein again.

According to improvement on a format of the BWMap message received by the ONU in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

With reference to a system architecture diagram in FIG. 1, the optical transceiver component 300 in FIG. 1 may include the transmitter 900 and the receiver 902 in FIG. 9. In addition, the transmitter 900 and the receiver 902 may be assembled into a component, such as an optical module, or may be disposed separately.

The processor 904 is not shown for the ONU 120 in FIG. 1, but the ONU also includes the processor 904. The processor 904 in FIG. 9 may be a MAC or another microprocessor.

The PON system 100 shown in FIG. 1 includes an OLT 110 and an ONU 120, and the OLT 110 is connected to the ONU 120 using an ODN. For a structure of the OLT 110, refer to descriptions of a specific structure of the foregoing OLT, for a specific structure of the ONU, refer to descriptions of a specific structure of the foregoing ONU, and for functions performed by the OLT and the ONU, refer to descriptions of the foregoing embodiments respectively. Details are not described herein again.

According to improvement on a format of the BWMap message generated by the OLT in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

Figure 10:
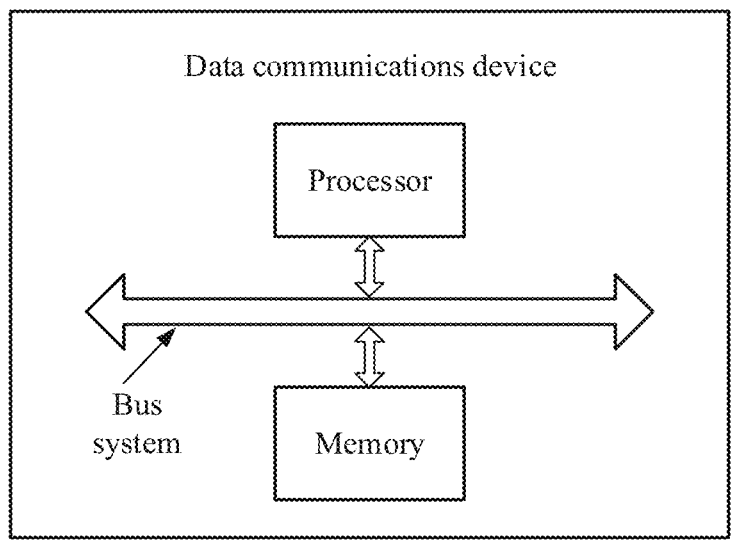
FIG. 10 is a schematic structural diagram of data communications device according to an embodiment of this application.

As shown in FIG. 10, an embodiment of the present disclosure further provides a data communications device. As shown in FIG. 10, the data communications device includes a processor, a memory, and a bus system. The processor and the memory are connected using the bus system, the memory is configured to store an instruction, and the processor is configured to execute the instruction stored in the memory.

When the data communications device is an OLT, the processor is configured to receive a bandwidth request sent by each ONU, where the ONU includes a first ONU1, generate a BWMap message according to bandwidth requested by the ONU and bandwidth configured for the ONU, where the BWMap message includes a first allocation identifier Alloc-ID1, a first time corresponding to the Alloc-ID1, a second allocation identifier Alloc-ID2, and a second time corresponding to the Alloc-ID2, and both the Alloc-ID1 and the Alloc-ID2 are allocated to the ONU1 for use, and send the BWMap message to each ONU.

In another embodiment, when the data communications device is an ONU, the processor may be configured to send a BWMap request to an OLT to request the OLT to allocate bandwidth, and receive a BWMap message returned by the OLT, where the BWMap message includes an Alloc-ID1, a first time corresponding to the Alloc-ID1, an Alloc-ID2, and a second time corresponding to the Alloc-ID2, and both the Alloc-ID1 and the Alloc-ID2 are allocated to the first ONU1 for use.

The sequence numbers of the foregoing embodiments of this application are merely for illustrative purposes, but are not intended to indicate priorities of the embodiments.

According to a format of the BWMap message in this embodiment of this application, not only a service flow transmission interval of each ONU can be shortened, but also a transmission delay of the ONU is greatly reduced. It can be learned from an experiment that an average transmission delay of the ONU can be reduced to within 20 µs such that a problem that a transmission delay does not satisfy a requirement when a PON system is applied to mobile backhaul is resolved, a data transmission rate and data transmission efficiency are improved, and user satisfaction is improved.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely specific embodiments of this application, but are not intended to limit this application. Any modification, equivalent replacement, or improvement made without departing from the spirit and principle of this application should fall within the protection scope of this application.

What is claimed is:

1. A bandwidth allocation method comprising:
generating a bandwidth map (BWMap) message according to bandwidth configured for a plurality of optical network units (ONUs), wherein the BWMap message comprises first allocation identifiers, wherein each first allocation identifier corresponds to a different time slot in a grant period corresponding to the BWMap message, wherein the grant period is 125 microseconds (µs), and wherein the first allocation identifiers are allocated to a first ONU of the ONUs; and
sending the BWMap message to each of the ONUs.

2. The method of claim 1, wherein the BWMap message further comprises at least two second allocation identifiers, wherein each second allocation identifier corresponds to a different time slot, wherein the second allocation identifiers identify a second ONU of the ONUs.

3. The method of claim 2, wherein second intervals of adjacent second allocation identifiers are the same.

4. The method of claim 1, wherein the different time slots comprise a first time slot and a second time slot, wherein the first time slot comprises a first start time and a first end time, wherein the second time slot comprises a second start time and a second end time, wherein the first start time indicates a first byte at which the first ONU starts to transmit a first data stream, wherein the first end time indicates a second byte at which the first ONU ends transmission of the first data stream, wherein the second start time indicates a third byte at which the first ONU starts to transmit a second data stream, wherein the second end time indicates a fourth byte at which the first ONU ends transmission of the second data stream, and wherein the first data stream and the second data stream carry service flows of a same type or service flows of different types.

5. The method of claim 1, wherein adjacent first allocation identifiers are not contiguous, and wherein intervals of the adjacent allocation identifiers are the same.

6. The method of claim 1, wherein the BWMap message comprises two first allocation identifiers and a third allocation identifier, the third allocation identifier is allocated to a third ONU of the ONUs, and the third allocation identifier is located between the two first allocation identifiers.

7. A bandwidth allocation method comprising receiving a bandwidth map (BWMap) message from an optical line terminal (OLT), wherein the BWMap message comprises first allocation identifiers, wherein each first allocation identifier corresponds to a different time slot in a grant period corresponding to the BWMap message, and wherein the grant period is 125 microseconds (µs).

8. The method of claim 7, further comprising:
    obtaining, according to at least two allocation identifiers of a first ONU, at least two first times corresponding to the first ONU;
    transmitting first data according to one of the at least two first times; and
    transmitting second data according to another one of the at least two first times.

9. The method of claim 7, wherein adjacent first allocation identifiers are not contiguous, and wherein intervals of the adjacent allocation identifiers are the same.

10. The method of claim 7, wherein the different time slots comprise a first time slot and a second time slot, wherein the first time slot comprises a first start time and a first end time, wherein the second time slot comprises a second start time and a second end time, wherein the first start time indicates a first byte at which the first ONU starts to transmit a first data stream, wherein the first end time indicates a second byte at which the first ONU ends transmission of the first data stream, wherein the second start time indicates a third byte at which the first ONU starts to transmit a second data stream, wherein the second end time indicates a fourth byte at which the first ONU ends transmission of the second data stream, and wherein the first data stream and the second data stream carry service flows of a same type or service flows of different types.

11. The method of claim 7, wherein the BWMap message further comprises at least two second allocation identifiers, wherein each second allocation identifier corresponds to a different time slot, wherein the second allocation identifiers identify a second ONU, and wherein a second interval of adjacent second allocation identifiers is the same.

12. The method of claim 7, wherein the BWMap message comprises two first allocation identifiers and a third allocation identifier, the third allocation identifier is allocated to a third ONU, and the third allocation identifier is located between the two first allocation identifiers.

13. An optical line terminal (OLT) comprising:
    a processor configured to generate a bandwidth map (BWMap) message according to bandwidth configured for a plurality of optical network units (ONUs), wherein the BWMap message comprises first allocation identifiers, wherein each first allocation identifier corresponds to a different time slot in a grant period corresponding to the BWMap message, wherein the grant period is 125 µs, and wherein the first allocation identifiers are allocated to a first ONU of the ONUs; and
    a transceiver coupled to the processor and configured to send the BWMap message to the ONUs.

14. The OLT of claim 13, wherein the BWMap message further comprises at least two second allocation identifiers, wherein each second allocation identifier corresponds to a different time slot, wherein the second allocation identifiers identify a second ONU of the ONUs, and wherein a second interval of adjacent second allocation identifiers is the same.

15. The OLT of claim 13, wherein the different time slots comprise a first time slot and a second time slot, wherein the first time slot comprises a first start time and a first end time, wherein the second time slot comprises a second start time and a second end time, wherein the first start time indicates a first byte at which the first ONU starts to transmit a first data stream, wherein the first end time indicates a second byte at which the first ONU ends transmission of the first data stream, wherein the second start time indicates a third byte at which the first ONU starts to transmit a second data stream, wherein the second end time indicates a fourth byte at which the first ONU ends transmission of the second data stream, and wherein the first data stream and the second data stream carry service flows of a same type or service flows of different types.

16. The OLT of claim 13, wherein the BWMap message comprises two first allocation identifiers and a third allocation identifier, the third allocation identifier is allocated to a third ONU of the ONUs, and the third allocation identifier is located between the two first allocation identifiers.

17. An optical network unit (ONU) comprising a receiver configured to receive a bandwidth map (BWMap) message from an optical line terminal (OLT), wherein the BWMap message comprises first allocation identifiers, wherein each first allocation identifier corresponds to a different time slot in a grant period corresponding to the BWMap message, and wherein the grant period is 125 microseconds (µs).

18. The ONU of claim 17, further comprising a processor coupled to a transmitter and the receiver, wherein the processor is configured to:
    obtain, according to at least two allocation identifiers of the ONU, at least two time slots corresponding to the ONU; and
    instruct the transmitter to transmit data in the time slots, and
    wherein the transmitter is configured to:
    transmit first data according to one of the time slots; and
    transmit second data according to another one of the time slots.

19. The ONU of claim 17, wherein the BWMap message comprises two first allocation identifiers and a third allocation identifier, the third allocation identifier is allocated to a third ONU, and the third allocation identifier is located between the two first allocation identifiers.

20. The ONU of claim 17, wherein the different time slots comprise a first time slot and a second time slot, wherein the first time slot comprises a first start time and a first end time, wherein the second time slot comprises a second start time and a second end time, wherein the first start time indicates a first byte at which the ONU starts to transmit a first data stream, wherein the first end time indicates a second byte at which the ONU ends transmission of the first data stream, wherein the second start time indicates a third byte at which the ONU starts to transmit a second data stream, wherein the second end time indicates a fourth byte at which the ONU ends transmission of the second data stream, and wherein the first data stream and the second data stream carry service flows of a same type or service flows of different types.

21. A data stream transmitting method comprising:
receiving, by an optical network unit (ONU), a bandwidth map (BWMap) message from an optical line terminal (OLT), wherein the BWMap message includes a grant period for data transmission, and the grant period is 125 microseconds (µs);
sending, by the ONU, a data stream of the ONU to the OLT in a first time slot of the grant period; and
sending, by the ONU, the data stream of the ONU to the OLT in a second time slot of the grant period, wherein at least one time slot is spaced between the first time slot and the second time slot.

22. The method of claim 21, wherein the first time slot comprises a first start time and a first end time, wherein the first start time indicates a first byte at which the ONU starts to transmit the data stream, wherein the first end time indicates a second byte at which the ONU ends transmission of the data stream.

23. The method of claim 21, wherein the BWMap message comprises a first allocation identifier of the ONU corresponds to the first time slot of the grant period, and a second allocation identifier of the ONU corresponds to the second time slot of the grant period.

24. An optical network unit (ONU) comprising:
a transceiver configured to receive a bandwidth map (BWMap) message from an optical line terminal (OLT), wherein the BWMap message includes a grant period for data transmission, and the grant period is 125 microseconds (µs);
the transceiver is configured to send a data stream of the ONU to the OLT in a first time slot of the grant period; and to send the data stream of the ONU to the OLT in a second time slot of the grant period, wherein at least one time slot is spaced between the first time slot and the second time slot.

25. The ONU of claim 24, wherein the first time slot comprises a first start time and a first end time, wherein the first start time indicates a first byte at which the ONU starts to transmit the data stream, wherein the first end time indicates a second byte at which the ONU ends transmission of the data stream.

26. The ONU of claim 24, wherein the BWMap message comprises a first allocation identifier of the ONU corresponds to the first time slot of the grant period, and a second allocation identifier of the ONU corresponds to the second time slot of the grant period.

* * * * *